United States Patent
Price et al.

(10) Patent No.: US 10,567,526 B2
(45) Date of Patent: Feb. 18, 2020

(54) USER INTERACTION ANALYSIS OF NETWORKED DEVICES

(71) Applicant: PALO ALTO RESEARCH CENTER INCORPORATED, Palo Alto, CA (US)

(72) Inventors: Robert R. Price, Palo Alto, CA (US); Anirban Roy, Corvallis, OR (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 81 days.

(21) Appl. No.: 15/824,688

(22) Filed: Nov. 28, 2017

(65) Prior Publication Data

US 2019/0166211 A1 May 30, 2019

(51) Int. Cl.

| G06F 15/173 | (2006.01) |
| H04L 29/08 | (2006.01) |
| H04L 12/28 | (2006.01) |
| H04L 12/26 | (2006.01) |
| G06F 16/23 | (2019.01) |
| G06K 9/62 | (2006.01) |
| G06N 3/08 | (2006.01) |
| H04L 12/24 | (2006.01) |

(52) U.S. Cl.
CPC .......... *H04L 67/22* (2013.01); *G06F 16/2358* (2019.01); *G06K 9/6263* (2013.01); *G06K 9/6267* (2013.01); *G06N 3/08* (2013.01); *H04L 12/282* (2013.01); *H04L 12/2829* (2013.01); *H04L 43/067* (2013.01); *H04L 43/0817* (2013.01); *H04L 41/16* (2013.01); *H04L 41/5074* (2013.01); *H04L 43/16* (2013.01); *H04L 2012/285* (2013.01)

(58) Field of Classification Search
CPC ... H04L 29/08072; H04L 29/06; H04L 41/16; H04L 43/16; H04L 67/22
USPC .................. 709/220, 224, 226, 228
See application file for complete search history.

(56) References Cited

U.S. PATENT DOCUMENTS

| 9,227,140 | B2* | 1/2016 | Muller .............. A63F 13/45 |
| 9,626,841 | B2* | 4/2017 | Fadell .............. G08B 27/003 |
| 9,883,035 | B1* | 1/2018 | Kulkarni ........... G06K 9/00771 |
| 10,133,918 | B1* | 11/2018 | Chang .............. G06K 9/00308 |
| 2007/0059685 | A1* | 3/2007 | Kohne .............. C12Q 1/6809 435/5 |
| 2011/0277001 | A1 | 11/2011 | Kaluskar et al. |
| 2012/0142429 | A1* | 6/2012 | Muller .............. A63F 13/45 463/42 |
| 2014/0011595 | A1* | 1/2014 | Muller .............. A63F 13/45 463/42 |

(Continued)

OTHER PUBLICATIONS

Extended European Search Report dated Mar. 14, 2019 for European Patent Application No. 18207663.8.

*Primary Examiner* — Khanh Q Dinh
(74) *Attorney, Agent, or Firm* — Womble Bond Dickinson (US) LLP; Daniel E. Ovanezian (57) ABSTRACT

A method of monitoring user interactions with a networked device includes receiving log data of a control signal of a networked device, the networked device associated with a user. An interaction monitoring system may analyze the log data of the control signal to determine a temporal feature of the control signal. A processing device may then classify a user interaction level for the user based on the determined temporal features and generate a feedback response to the user based on the user interaction level.

18 Claims, 5 Drawing Sheets

(56) References Cited

U.S. PATENT DOCUMENTS

| | | | |
|---|---|---|---|
| 2014/0324741 A1* | 10/2014 | Stewart | G06N 20/00 |
| | | | 706/12 |
| 2015/0145643 A1* | 5/2015 | Fadell | G06Q 10/083 |
| | | | 340/5.51 |
| 2015/0234829 A1 | 8/2015 | Yoshitake et al. | |
| 2016/0195861 A1 | 7/2016 | Chen et al. | |
| 2018/0253219 A1* | 9/2018 | Dotan-Cohen | G06F 16/907 |
| 2019/0201786 A1* | 7/2019 | Muller | A63F 13/12 |

\* cited by examiner

USER INTERACTION ANALYSIS OF NETWORKED DEVICES

TECHNICAL FIELD

Implementations of the present disclosure relate to analytics of networked devices.

BACKGROUND

The internet of things (IoT) refers to the connection of various devices to the internet or another network through embedded processors and transceivers. For example networked devices that are part of the IoT may appear as an everyday object, but may send or receive data over a network connection. Sent data may include operations, configurations, sensor readings or the like recorded by the networked device. Data received by the networked device may include configuration data, software or firmware updates, instructions, or the like.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Advancing technology enables an increasing number of devices to access the internet or other networks. For instance, refrigerators, microwaves, thermostats, watches, lights, coffee makers, or virtually any other device can be provided a wireless connection. Such networked devices may provide customization of control and feedback that a non-connected device cannot. For instance, a networked device may provide an indication of the devices status, sensor readings, operating logs, or other information. Networked devices may also be controlled or configured over the network connection.

While networked devices may provide additional benefits over non-connected devices, some users may not utilize the provided features. Users not utilizing the additional features provided by a networked device may not be satisfied with the device. Therefore, increasing user interaction with networked devices may increase user satisfaction. However, determining user interaction with some networked devices may be difficult for a variety of reasons. First, the networked device may be controlled by an application or apparatus that is not related to the networked device. For instance, in a home automation product, the networked device may be controlled by a control unit that is unrelated to the networked device. Accordingly, the interactions between a user and the control unit may not be shared with a server attempting to monitor interactions with the networked device. Additionally, data that is shared by a networked device with a system monitoring user interactions may not include a log of specific user interactions. Instead, the shared data may include information related to the operation, sensor readings, or other information about the networked device.

In some embodiments, in order to determine a level of user interaction with a networked device, an interaction monitoring system may receive and analyze log data from the networked device, such as control signals generated by the networked device, in order to generate an estimation of a user interaction level with the device. In some embodiments, an interaction monitoring system may receive log data for a particular networked device. The interaction monitoring system may then analyze the log data received from the networked device. In some embodiments, the analysis generates a set of features about a user's interactions based on the log data. For example, the analysis may generate one or more temporal features, such as the amount of time between interactions, total operating time of the device, cycle of the device, time between changes in device operation. In some embodiments, other features may be generated instead or in addition. For instance, average power level, number of changes to power levels, or any other features that may indicate interactions of the user with the networked device. In some embodiments, the interaction monitoring system uses the variance of a control signal over time to determine a user interaction level. For example, the interaction monitoring system may correlate higher variance of a control signal with higher levels of user interaction and lower variance of the control signal with lower levels of user interaction.

In addition to using the control signals to determine features, an interaction monitoring system may use additional information from the networked device, or other networked devices, to determine correlations between control signals and other events. For example, sensor outputs from a networked device may be correlated to control signal responses to determine if particular sensor outputs are associated with an increase or decrease in likelihood of a user interaction.

In some embodiments, based on the determined features, an interaction monitoring system may classify a level of user engagement for a user of a particular networked device. For example, the features determined for a user may be compared to those of other users to determine if a user is more or less engaged than an average user. In some embodiments, users may be classified based on a set of rules that classify users based on one or more temporal features for each user.

Based on an interaction classification for a user, an interaction monitoring system may determine a feedback response to provide to a user. In some embodiments, a feedback response to a user may include guidance or instruction for installing a device or program associated with a device, customer support to help using the device, replenishing a resource used by a device, recommendation of additional products to users, prompting a user to try a new feature of a device, or otherwise providing the user with additional instructions or information about the networked device.

In some embodiments, the networked device monitored by an interaction monitoring system may be an IoT connected consumer home device. The networked device may be plugged into a wall or battery operated. In some embodiments, a feature or configuration of the networked device may be controlled through control signals received over a network. In some embodiments, the networked device may have multiple features to provide additional functionality. A networked device may include one or more processing devices and one or more transceivers to control operation of the networked device. For example, the processing device may determine when to turn a feature of the device on or off. In some embodiments, a processing device may also record log data regarding operation or status of an networked device. For example, the processing device may record control signals that are provided by the processing device to a feature. In some embodiments, the processing device may also record additional information, such as sensor output data, additional control data, or the like. For example, the processing device may record one or more of temperature, humidity, motion, light sensors, gas sensors, or any other sensor present on a networked device.

In some embodiments, the networked device may be connected to a wireless network through a processing device and transceiver. The networked device may receive data through the wireless network with configuration information or instructions to change operation. For example, a message received by the networked device may set a timer for the device, turn the device on or off, or otherwise change the operation of the device. The networked device may also provide at least a portion of the log data stored by the processing device during operation. In some embodiments, the log data may be uploaded from the devices at set intervals. For example, the data could be uploaded hourly, daily, weekly, or at any other interval. In some embodiments, the log data may be uploaded continuously be the networked device or may be uploaded when certain network conditions are met.

In some embodiments, log data from the networked device may be uploaded to an interaction monitoring system. The interaction monitoring system may then filter and analyze the log data to determine features of the log data. For example, temporal features indicating user interaction may be determined for log data associated with a particular user. The interaction monitoring system may use the features to classify a level of interaction between a user and the networked device. In some embodiments, the interaction monitoring system may then determine a feedback response to provide to a user at least in part based on the level of interaction. The interaction monitoring system may then provide the feedback response to the user through an interface associated with the user. For example, the interaction monitoring system may provide an email to an account associated with the user, an alert to an application on a device associated with the user, or otherwise provide the user with some feedback response tailored to the user's interaction level.

While some embodiments described below are generally described with reference to a networked device, the interaction monitoring system may also be used for a variety of other networked devices. For example, an interaction monitoring system may monitor control signals from other networked devices such as refrigerators, microwaves, thermostats, watches, lights, or other networked devices.

Figure 1:
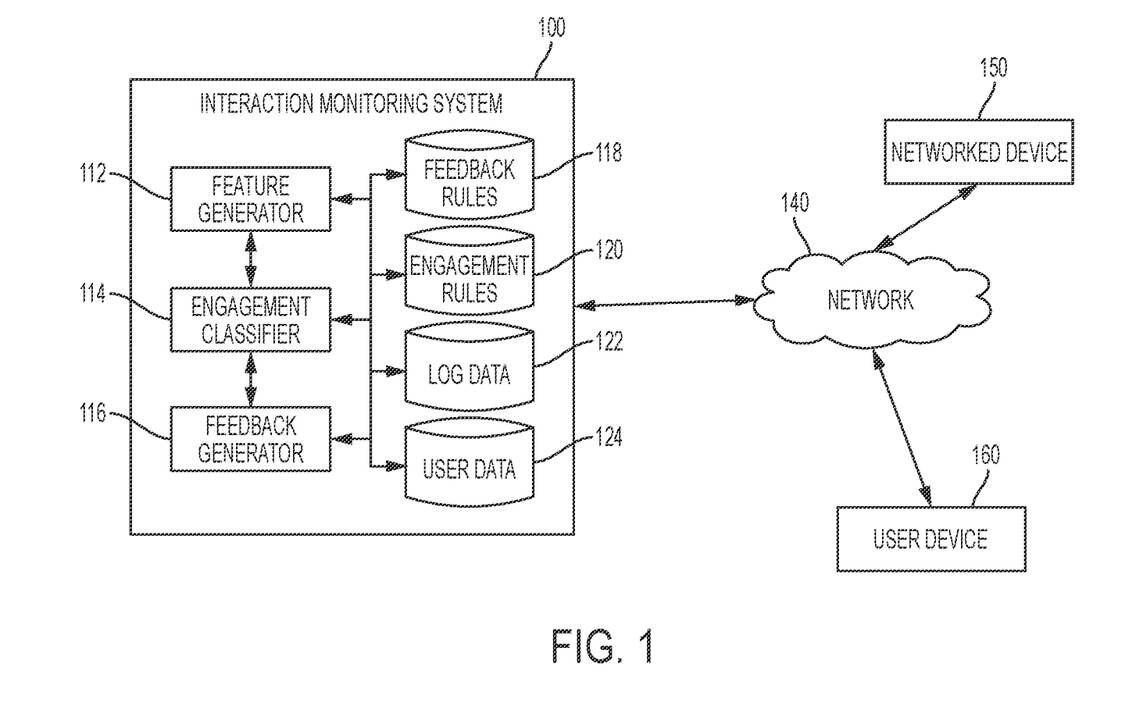
FIG. 1 is a schematic diagram of an embodiment of an interaction monitoring system, which can be used in accordance with some embodiments.

FIG. 1 is a diagram showing an interaction monitoring system 100 for use with implementations of the present disclosure. Although specific components are disclosed in interaction monitoring system 100, it should be appreciated that such components are examples. That is, embodiments of the present invention are well suited to having various other components or variations of the components recited in interaction monitoring system 100. It is appreciated that the components in interaction monitoring system 100 may operate with other components than those presented, and that not all of the components of interaction monitoring system 100 may be required to achieve the goals of interaction monitoring system 100. For example, in some embodiments, the feature generator 112 and the engagement classifier 114 may be a single unit such as a multi-stage neural network.

In FIG. 1, an interaction monitoring system 100 receives log data from a networked device 150 over a network 140. In some embodiments, the log data provided by the networked device 150 may include a log of control signals generated by a processing device or controller of the networked device 150. In some embodiments, the networked device may have an interface through which a user can change a setting or configuration of the networked device 150, such as turning a feature on or off. In some embodiments, the networked device 150 may be controlled through the network connection. For example, a user may interact with a user device 160 to control the networked device 150.

Based on settings, configurations, or instructions received by the networked device 150, the networked device may perform one or more operations related to its features. In some embodiments, the operations may be carried out with control signals generated in one or more processing devices or controllers of the networked device 150. The networked device 150 may then store a log of the control signals used during operation. In some embodiments, the networked device 150 may also store a log of sensor readings, errors, or other data used by or generated by the networked device 150.

The networked device 150 may send stored log data over the network 140 to an interaction monitoring system 100 continuously or intermittently. The log data may be sent when a wireless connection is available, periodically at set intervals, or at other times defined by the networked device 150. For example, the networked device may provide log data in response to a sensor reading such as a motion detector. In some embodiments, the interaction monitoring system 100 may pull log data from networked device 150 or user device 160 when it determines a time to generate feedback to users.

In some embodiments, the user device 160 may be a smart home hub, a mobile device such as a smart phone or tablet, a computer, or another type of device. The user device 160 may include an application specific to the control of the networked device 150, or the user device 160 may control the operation of the networked device 150 over a web browser or other application. In some embodiments, there may be multiple user devices 160 that can each control at least a portion of the features, configurations, or settings of the networked device 150.

The interaction monitoring system 100 may receive log data 122 from the networked device 150. The interaction monitoring system 100 may have a number of subsystems or modules to analyze information in log data 122. For example, the interaction monitoring system 100 may have a feature generator 112, an engagement classifier 114, and a feedback generator 116. In some embodiments, the interaction monitoring system 100 may have fewer or additional processing components. In addition, the interaction monitoring system may have a number of data stores to store log data 122, as well as feedback rules 118, engagement rules 120, and user data 124 for use by the interaction monitoring system. In some embodiments, additional data stores may store additional rules or information.

In some embodiments, the feature generator 112, the engagement classifier 114, and the feedback generator 116 may be operatively communicatively coupled to one another. For example, the components may provide data to each other. In addition the data stores 118, 120, 122, and 124 may be communicatively or operatively coupled to the feature generator 112, the engagement classifier 114, and the feedback generator 116. In various embodiments, the components of the interaction monitoring system 100 may be operatively or communicatively coupled in other ways than as shown in FIG. 1.

In some embodiments, the interaction monitoring system 100 may perform pre-processing on log data 122. For example, the interaction monitoring system 100 may receive log data 122 from many networked devices 150 and the interaction monitoring system 100 may filter the log data 122 based on an identification of a particular networked device 150 or a user associated with a networked device. In some embodiments, the log data 122 may also be filtered to remove noise, outlier data points, signals that are not used to monitor user interactions, or otherwise prepare log data 122 to use in determining a user's level of engagement with a networked device 150.

In some embodiments, the interaction monitoring system 100 may train a neural network or other machine learning algorithm to determine a set of feature from log data received from a number of networked devices. For example, the interaction monitoring system 100 may receive log data from a number of devices associated with users that completed a survey, wherein the survey provides an indication of one or more levels of satisfaction with one or more different features of the networked devices. The log data may then be provided as inputs to a neural network with the satisfaction levels from the user surveys as outputs for the network. The network may then be trained with the inputs and outputs until an threshold level of accuracy is met by the system.

In some embodiments, feature generator 112 may determine a number of features about log data 122. For example, the feature generator 112 may take data points from the log data 122 that indicate a control signal of the networked device 150 to determine one or more features from the data. Features may include temporal features such as frequency of device usage, total duration of use of the device, number of cycles of using the device, average time between uses of the device, average duration of use of the device each time it is used, or other indication of the time or frequency that a device has been used. In some embodiments, the feature generator 112 may calculate other features such as the average power level indicated by a control signal, the number of different types of control signals, or other features present in the log data 122. In some embodiments, the feature generated by the feature generator 112 may be a variance in the control signal level. For example, the variance may indicate how much a control signal was changed over a period of time, which may provide an indication of user interactions. In some embodiments, the feature generator may calculate an entropy associate with signals to determine a level of interaction.

In some embodiments, features may be extracted by the feature generator 112 based on a neural network. For example, the feature generator 112 may be, or include, a neural network trained by a set of log data associated with a number of users and networked devices over time. The neural network may generate a user satisfaction level, or other features of log data provided for a networked device.

In some embodiments, the feature generator 112 may extract additional features from the received log data or other log data associated with the user. For example, the feature generator 112 may determine that a user has figured out how to set temperature profiles that vary on the weekends but may not have figured out that there are multiple modes that can be set on a light. In some embodiments, the feature generator 112 may further determine how the user is currently using device features so that feedback responses can further instruct the user about additional features they are not using.

The features generated by the feature generator 112 may be used by the engagement classifier 114 to determine an engagement level of the user of the networked device 150. The engagement classifier 114 may use a set of engagement rules 120 to determine an engagement level of the user based on the generated features. In some embodiments, the engagement rules 120 may weight one or more temporal features of the control signals in the log data 122. For example, the engagement rules 120 may provide a weight to apply to a frequency of use feature and to a total time of use feature. The engagement classifier 114 may apply these rules to the features for a user to determine a score or other indicator of the user's engagement. In some embodiments, the engagement classifier 114 may provide a classification such as low, medium, or high engagement based on the score. In some embodiments, the engagement classifier may provide the score itself. In some embodiments, the engagement classifier 114 may generate features that are specific to different uses of the networked device 150. For example, the engagement classifier 114 may determine a classification score for scent feature of a networked device 150, a second score for a light feature of the networked device 150, or other scores for other features and components of the networked device 150.

In some embodiments, the engagement classifier 114 may determine a classification for a user based on providing the features extracted by the feature generator 112 to a trained neural network. For example, the feature generator 112 may provide a number of temporal features to the engagement classifier 114. The engagement classifier 114 may be, or include, a neural network trained by a set of temporal features associated with a number of users and networked devices. The neural network may then generate a user satisfaction level, or other engagement classification, based on the temporal features received for new log data analyzed by the feature generator 112.

The feedback generator 116 may determine a feedback response to provide to a user based on the engagement classification. For example, a feedback response may include additional guidance to install the networked device 150 or a control application for the networked device 150 in response to a user not having engaged with the device. In some embodiments, there may be a number of feedback responses depending on the engagement level determined by the engagement classifier 114. For instance, a feedback response providing customer support may be provided to a user with low engagement, while a feedback response recommending additional products may be provided to a user showing high engagement. The feedback generator 116 may determine appropriate feedback based on feedback rules 118. The feedback rules 118 may correlate an engagement level determined for a user with a particular type of feedback. In some embodiments, the feedback rules 118 may be updated or changed such that different feedback is provided in response to the same level of engagement at a later time. In some embodiments, the feedback generator 116 may further determine a feedback response based on the types of interactions from a user. For example, if one feature of a networked device 150 is being engaged with by the user and another feature is not, the feedback generator 116 may determine a response based on the type of features engaged with.

In some embodiments, the feedback generator 116 may take into account additional information to generate feedback. For example, the feedback generator 116 may use user data 124 to determine a previous feedback response provided to the user. The feedback response may also use demographic, historical, or other data stored in user data 124 to determine a feedback response tailored for the user based on user data 124 and the determined engagement level.

Once the interaction monitoring system 100 determines a feedback response to provide to a user based on the log data 122 associated with the networked device 150, the interaction monitoring system 100 may provide that feedback to the user. In some embodiments, the interaction monitoring system 100 may determine one or more contact options associated with a user of networked device 150 from user data 124. For example, the contact options may be email accounts, applications installed on a device registered to the user, phone numbers, or other contact methods. The interaction monitoring system 100 may then determine a contact option that supports the determined feedback response and provide the feedback response to the user. In some embodiments, the feedback generator 116, or a communication module of interaction monitoring system 100 may then provide the determined feedback response to a user device 160 or a networked device 150 based on the type of feedback.

FIGS. 2A-2D illustrate example control signal levels associated with particular networked devices. For example, the control signals may be generated by the networked device 150 as shown in FIG. 1. In some embodiments, the control signals may be filtered by an interaction monitoring system from log data received from a networked device. In some embodiments, the control signals may indicate a duty cycle of a pulse width modulation control of a component of a networked device. In some embodiments, the control signal may control one or more features of a networked device.

Figure 2A:
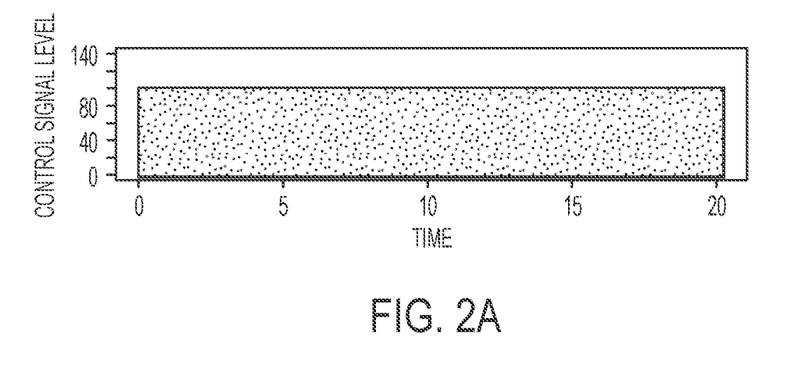
FIG. 2A is an operation diagram showing example control signal data used by an interaction monitoring system in accordance with some embodiments.

In FIG. 2A, the control signal level shown in the log data is at a constant level. This may indicate that a user plugged in a networked device, but never changed the operation after. This may indicate that a user does not modify the operation of the control signal or otherwise provide instructions or configurations to the networked device. A user that is not using the networked features of the networked device may not be satisfied with the networked device.

Figure 2B:
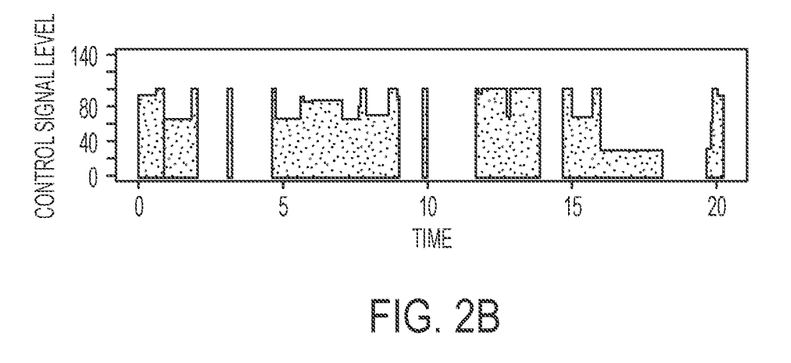
FIG. 2B is an operation diagram showing example control signal data used by an interaction monitoring system in accordance with some embodiments.

In FIG. 2B, the control signal shows that it was turned on an off several times over a period of time. The control signal is also at different levels at different times. Accordingly, the interaction monitoring system may determine that the user is engaged with the device based on the control signal log data shown in FIG. 2B.

Figure 2C:
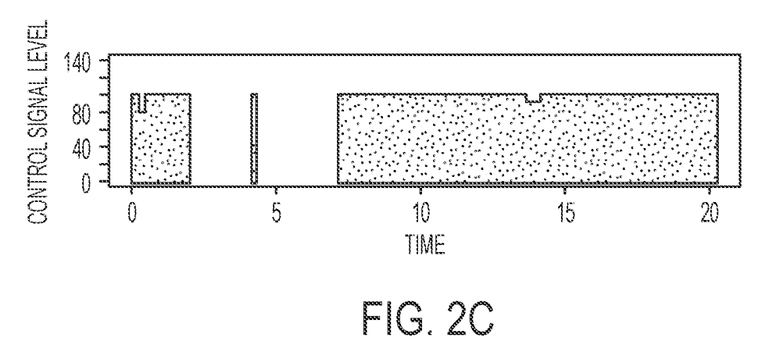
FIG. 2C is an operation diagram showing example control signal data used by an interaction monitoring system in accordance with some embodiments.

In FIG. 2C, the control signal shows that the networked device was operating at a single power level, but turned on an off several times over the monitored time period. Accordingly, the interaction monitoring system may determine that the user is engaged. However, the user could use additional features, such as changing the level of operation or configuring a timer. In some embodiments, the interaction monitoring system may provide a feedback response that provides information about the additional features of the networked device.

Figure 2D:
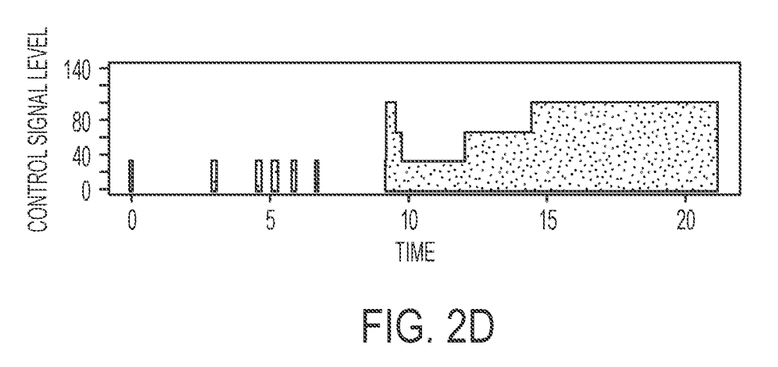
FIG. 2D is an operation diagram showing example control signal data used by an interaction monitoring system in accordance with some embodiments.

In FIG. 2D, the control signal shows that the networked device was used on multiple occasions. The control signal also shows that the power level of the operation of the networked device was changed over time. Accordingly, the interaction monitoring system may determine that the user was engaged. In some embodiments, if the networked device is frequently in an off state, the interaction monitoring system may determine that there may be a networking error at the location of the networked device. Accordingly, the interaction monitoring system may provide a feedback response for troubleshooting a network of the networked device.

Figure 3:
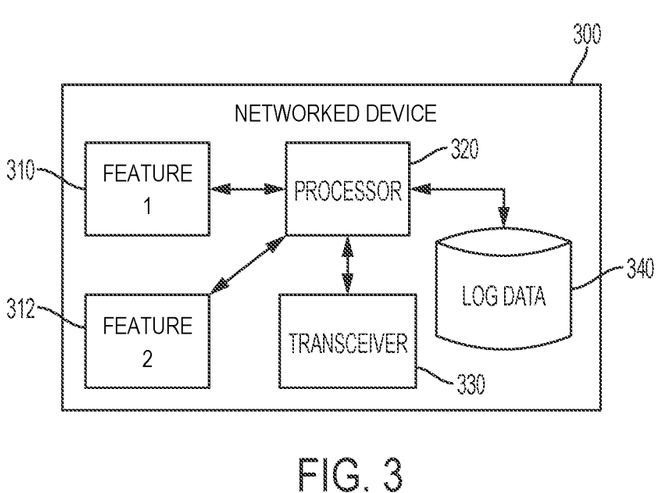
FIG. 3 is a schematic diagram showing an embodiment of a networked device, which can be used in accordance with some embodiments.

FIG. 3 illustrate an example networked device 300. The networked device 300 may be the networked device 150 as shown in FIG. 1. The networked device may include a feature 1 310, a feature 2, 312, a processing device 320, and a transceiver 330. In addition, the networked device 300 may include a data store to store log data 340 or other information related to the operation of the networked device 300.

In some embodiments, the processor 320 may be operatively or communicatively coupled to the feature 1 310, feature 2, 312, transceiver 330, and log data 340. For example, the processor 320 may provide control signals to the features 310, 312. In addition, the processor may store data in log data 340 or retrieve data in log data 340. Furthermore, the processor may provide data to transceiver 330 and receive data through transceiver 330. In various embodiments, the components of the networked device may be operatively or communicatively coupled in other ways than as shown in FIG. 3.

The transceiver 330 may receive data from one or more controllers that include instructions, configurations, settings, or other information that the networked device 300 uses to perform operations. The transceiver 330 may also provide data over a network to an interaction monitoring system, such as log data 340, indicating the operation of the networked device.

In some embodiments, the networked device 300 may include one or more features (e.g., feature 1 310 and feature 2, 312). The features may provide one or more functionalities to the networked device 300 that may be controlled through commands over the network or based on configurations that may be changed over the network. In some embodiments, the networked device 300 may contain only a single feature (e.g., one of feature 1 310 or feature 2 312) to provide a functionality of the networked device. In some embodiments, the networked device 300 may contain additional features than shown in FIG. 3.

The processing device 320 may use signals received through transceiver 330 to determine and control the operation of the networked device 300. For example, based on a configuration setting of the networked device 300, the processing device may increase or decrease a control signal of a features (e.g., feature 1 310 or feature 2 312). In some embodiments, the processing device 320 may control features 310, 312 with control signals that determine an output energy from the features 310, 312. In some embodiments, the control signals are pulse width modulation signals controlling a power output for the features 310, 312.

In addition to controlling the output energy of individual features, the processing device 320 may record an activity log as log data 340. The log data 340 may include a record of the control signals generated by the processing device 320 as well as additional data. For example, the processing device 320 may include a record of the control signals provided to the features 310, 312, and may also include a record of temperature, humidity, or other sensor recordings related to the operation of the networked device.

The log data 340 stored by the processing device 320 may then be sent to a interaction monitoring system, such as the interaction monitoring system 100 as described with reference to FIG. 1, by the processing device 320 and transceiver 330. In some embodiments, the log data may be sent continuously, intermittently based on wireless signals, or periodically at predetermined times. In some embodiments, the interaction monitoring system may then use the log data 340 provided by the networked device 300 to determine interaction levels and feedback responses as discussed with reference to FIG. 1.

While a networked device 300 is provided as an example of a networked device as described herein, the disclosure includes other networked devices. For example, other networked devices may include refrigerators, thermostats, lights, windows, or other connected devices within a home setting, business setting, or other IoT devices in other settings. The networked devices in other settings may not include features as described with reference to FIG. 3, but may include other elements that are controlled by a processing device 320 based on information received through a transceiver 330. In addition, other networked devices may include log data indicating control signals provided by a processing device 320 (or other processing or control components) to control one or more features or operations of a networked device. Furthermore, the control signals may be pulse width modulations as discussed with reference to networked device 300, or may be other forms of signals that provide control of operations of networked devices.

Figure 4:
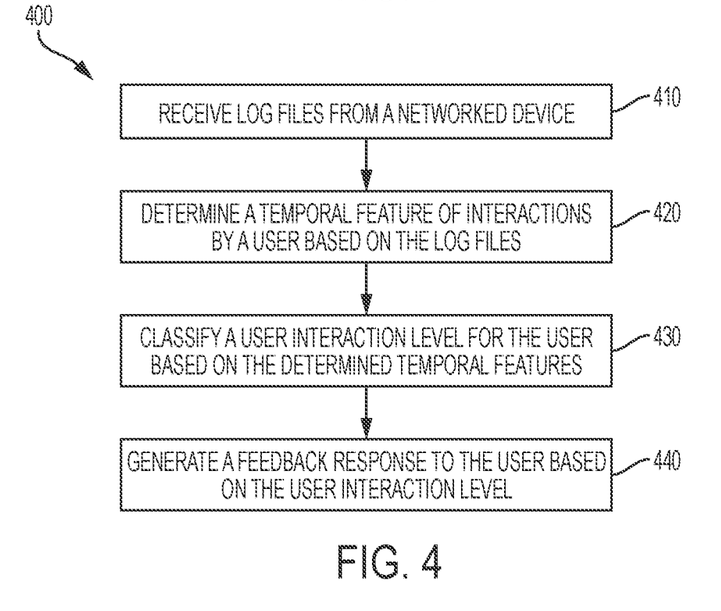
FIG. 4 is a flow diagram of an embodiment of a method of determining a feedback response based on log data in accordance with some embodiments.

FIG. 4 is a flow chart illustrating example operations of an interaction monitoring system. For example, the processes described with reference to FIG. 4 may be performed by an interaction monitoring system 100 as described with reference to FIG. 1. In some embodiments, the networked device as described with reference to FIG. 4 may be a networked device 300 as described with reference to FIG. 3.

Beginning in block 410, an interaction monitoring system may receive log files from a networked device. The log files may include data indicating one or more control signals used by the networked device to perform one or more operations. In some embodiments, the interaction monitoring system may filter or otherwise process the log data to prepare for analyzing the data.

In block 420, the interaction monitoring system determines a temporal feature of the interaction by a user associated with the log data. The user may have registered an account associated with the networked device. Determining the temporal feature may include accumulating or averaging control signal levels during a recorded time of operation associated with the log file. In some embodiments, the interaction monitoring system may determine other features in addition to or rather than determining temporal features. In some embodiments, the interaction monitoring system may determine temporal features using a neural network with log files as inputs and temporal features as outputs.

In block 430, the interaction monitoring system classifies a user interaction level for the user based on the determined temporal features. In some embodiments, the interaction monitoring system may have a finite set of user interaction levels based on threshold values associated with the temporal features. In some embodiments, the temporal features determined for a user may be compared to temporal features determined for other users. In some embodiments, the interaction monitoring system may determine a user interaction level using a neural network with determined temporal features as inputs. Furthermore, in some embodiments, the interaction monitoring system may determine a user interaction level with a neural network directly determining an interaction level with raw log files as an input.

In block 440, the interaction monitoring system may generate a feedback response to the user based on the user interaction level. In some embodiments, the interaction monitoring system may determine whether a user is estimated to be satisfied to determine whether or not to generate a feedback response. In some embodiments, a user may be estimated as not satisfied if there is limited engagement between the user and the networked device. This may indicated that the user is not using the networked device in a way that will be satisfying. Thus, the interaction monitoring system may provide additional information to help the user learn to use or want to use the networked device. In some embodiments, there may be different feedback responses to different user interaction classifications.

The interaction monitoring system may then provide the generated feedback response to the user. In some embodiments, the feedback response may be sent electronically to an account associated with the user. For example, the feedback response may be sent to a phone or tablet associated with the user. In some embodiments, the feedback response may be provided to an interface associated with the networked device. For example, a controller for networked devices in a home may have an interface enabled to show alerts or information provided by the interaction monitoring system. In some embodiments, the feedback response may be provided to the user in other ways.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

Figure 5:
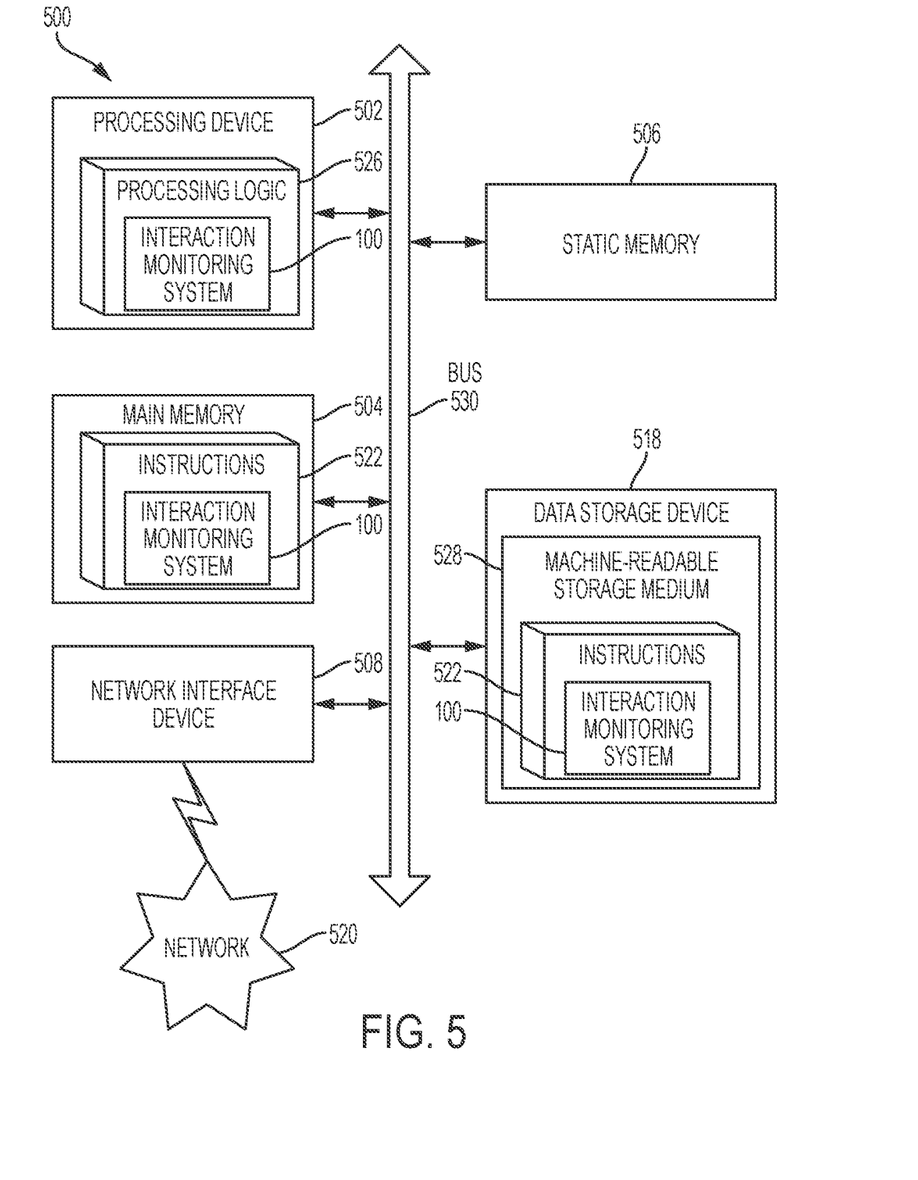
FIG. 5 is an illustration showing an example computing device which may implement the embodiments described herein.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server computer system, such as interaction monitoring system 100 configured to analyze log data of networked devices.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which may be one example of system 400 shown in FIG. 4, for performing the operations and steps discussed herein.

The data storage device 518 may include a machine-readable storage medium 528, on which is stored one or more set of instructions 522 (e.g., software) embodying any one or more of the methodologies of functions described herein, including instructions to cause the processing device 502 to execute interaction monitoring system 100. The instructions 522 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for analyzing log data received from networked devices, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method of monitoring networked devices, the method comprising:
   receiving log data of a networked device associated with a user, wherein the log data comprises data of a control signal of a networked device;
   analyzing the log data of the control signal to determine a temporal feature of the control signal;
   classifying, by a processing device, a user interaction level for the user based on the determined temporal feature; and
   generating, by the processing device, a feedback response to the user based on the user interaction level; and
   wherein analyzing the log data of the control signal comprises:
   identifying, in the log data, a plurality of changes to the control signal over a period of time; and
   generating the temporal feature based at least in part on a frequency of changes to the control signal over the period of time.

2. The method of claim 1, further comprising:
   receiving second log data for a second device, the second log data comprising a set of sensor readings of the second device; and
   identifying correlations between the log data and the second log data.

3. The method of claim 1, wherein generating the feedback response comprises:
   determining that the user interaction level for the user is classified below a threshold level; and
   selecting the feedback response from a plurality of feedback responses based on at least one of the user interaction level, a previous user interaction level, or a previous feedback response.

4. The method of claim 1, wherein classifying the user interaction level for the user further comprises comparing the temporal feature for the user to temporal features associated with other users.

5. The method of claim 1, further comprising providing the generated feedback response to a second device associated with the user or an account associated with the user.

6. The method of claim 1, wherein the feedback response comprises sending an electronic message to an account associated with the user and the feedback response comprises one of an indication of different features of the networked device or additional products associated with the networked device.

7. A method of monitoring user interactions of networked devices, the method comprising:
   receiving log data of a control signal of a networked device, the networked device associated with a user;
   analyzing the log data of the control signal to determine a temporal feature of the control signal;
   classifying, by a processing device, a user interaction level for the user based on the determined temporal feature;
   generating, by the processing device, a feedback response to the user based on the user interaction level;
   wherein analyzing the log data of the control signal comprises:
   identifying, in the log data, a plurality of changes to the control signal over a period of time; and
   generating the temporal feature based at least in part on a frequency of changes to the control signal over the period of time.

8. The method of claim 7, further comprising:
   receiving second log data for a second device, the second log data comprising a set of sensor readings of the second device; and
   identifying correlations between the log data and the second log data.

9. The method of claim 7, wherein generating the feedback response comprises:
   determining that the user interaction level for the user is classified below a threshold level; and
   selecting the feedback response from a plurality of feedback responses based on at least one of the user interaction level, a previous user interaction level, or a previous feedback response.

10. The method of claim 7, wherein analyzing the log data of the control signal comprises providing the log data to a neural network to generate the temporal features.

11. The method of claim 7, wherein classifying the user interaction level for the user further comprises comparing the temporal feature for the user to temporal features associated with other users.

12. The method of claim 7, further comprising providing the generated feedback response to a second device associated with the user or an account associated with the user.

13. The method of claim 7, wherein the temporal feature is a control signal variance and wherein determining the user engagement level comprises comparing the controls signal variance determined for the user to the average variance among other users.

14. An interaction monitoring system comprising:
   a memory; and
   a processing device, operatively coupled to the memory, to:
   receive log data of a control signal of a networked device, the networked device associated with a user;
   analyze the log data of the control signal to determine a feature of the control signal;
   classify a user interaction level for the user based on the determined feature;
   generate a feedback response to the user based on the user interaction level; and
   wherein to analyze the log data of the control signal, the processing device is further to:
   identify, in the log data, changes to the control signal over a period of time; and generate the features based at least on the identified changes to the control signal over the period of time.

15. The interaction monitoring system of claim 14, wherein to classify the user interaction level, the processing device is further to:
   receive second log data for a second device, the second log data comprising a set of sensor readings of the second device; and identify correlations between the log data and the second log data.

16. The interaction monitoring system of claim 14, wherein to generate the feedback response, the processing device is further to:
- determine that the user interaction level for the user is classified below a threshold level; and
- select the feedback response based on at least one of the user interaction level, a previous user interaction level, or a previous feedback response.

17. The interaction monitoring system of claim 14, wherein to classify the user interaction level for the user, the processing device is further to compare the temporal feature for the user to temporal features associated with other users.

18. The interaction monitoring system of claim 14, wherein the control signal in the log data is used by a networked device comprising one of a coffee maker, a thermostat, a light, or a refrigerator.

* * * * *